US008194064B2

(12) United States Patent
Kasai et al.

(10) Patent No.: US 8,194,064 B2
(45) Date of Patent: Jun. 5, 2012

(54) IMAGE DISPLAY DEVICE

(75) Inventors: Naruhiko Kasai, Yokohama (JP); Masato Ishii, Tokyo (JP); Tohru Kohno, Kokubunji (JP); Hajime Akimoto, Kokubunji (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 785 days.

(21) Appl. No.: 12/292,727

(22) Filed: Nov. 25, 2008

(65) Prior Publication Data

US 2009/0141015 A1 Jun. 4, 2009

(30) Foreign Application Priority Data

Nov. 30, 2007 (JP) ................................ 2007-310740

(51) Int. Cl.
*G06F 3/038* (2006.01)

(52) U.S. Cl. ......................................... 345/212; 345/55

(58) Field of Classification Search .................. 345/212, 345/55, 208, 204–206
See application file for complete search history.

(56) References Cited

U.S. PATENT DOCUMENTS 7,019,738 B2 * 3/2006 Tsutsui ......................... 345/211
7,633,496 B2 * 12/2009 Kasai et al. .................... 345/208
2002/0196213 A1 * 12/2002 Akimoto et al. ................ 345/82

FOREIGN PATENT DOCUMENTS

JP 2003-005709 6/2001

* cited by examiner

*Primary Examiner* — Amare Mengistu
*Assistant Examiner* — Towfiq Elahi
(74) *Attorney, Agent, or Firm* — Stites & Harbison, PLLC; Juan Carlos A. Marquez, Esq

(57) ABSTRACT

A shift in the frame of a moving image in an image display device using self-luminous element is made hard to see. A data line driving circuit is provided with a triangular wave generating circuit for generating a number of types of triangular waves having different phases and waveforms, and gradation voltage-triangular wave switching circuit for selecting and switching one of the number of types of triangular waves generated by the triangular wave generating circuit for each signal line. One horizontal period is divided into a signal write-in period and a triangular wave period, so that the signal voltage and triangular wave are outputted during the signal write-in period and the triangular wave period, respectively.

2 Claims, 11 Drawing Sheets

IMAGE DISPLAY DEVICE

BACKGROUND OF THE INVENTION

The present invention relates to an image display device in which an EL (electroluminescence) element, an organic EL element or another self-luminous element which is a self-luminous type display element is mounted.

Self-luminous elements, such as EL (electroluminescence) elements and organic EL elements, have such properties that the brightness is proportional to the current which flows through the self-luminous element, and thus, display with gradation is possible by controlling the current which flows through the self-luminous element. A display device can be fabricated by providing a number of such self-luminous elements.

Meanwhile, drive transistors for controlling the current which flows through the self-luminous element are inconsistent in terms of their properties, as a result of the manufacturing process, and this inconsistency in terms of the properties causes inconsistency in the drive current, and ultimately leads to inconsistency in the brightness, and thus is a factor in lowering the image quality.

As a circuit for solving this problem, Patent Document 1 (Japanese Unexamined Patent Publication 2003-5709) discloses a technology for display with gradation by writing a display data signal using the properties of the drive transistors as a reference during each horizontal period, and after that inputting a triangular wave for controlling the timing for illumination, and thus controlling the time for luminescence while cancelling inconsistency in the properties of the drive transistors.

SUMMARY OF THE INVENTION

In the technology disclosed in the above Patent Document 1, however, the horizontal timing with which signals are rewritten within one display period (frame) and the horizontal timing with which light is emitted are always constant, and therefore, there is a shift in the outline of the moving picture. FIG. 11 is a diagram showing the timing for rewriting signals and emitting light according to the prior art in the case where one longitudinal line is displayed while shifting laterally. In FIG. 11, 106 is a display image, 107 is write-in-light emission timing, and 108 is an actual display, and the display image 106 shows the first to sixth frame of the video originally desired to be displayed in sequence, and the vertical line indicates a video which shifts to the right.

The write-in-light emission timing 107 indicates chronological change in the state of light emission according to the prior art, where write-in and light emission are repeated during each horizontal period for the input of a video where a horizontal line shifts to the right, and chronological integral calculus of the state of light emission is the state of actual display 108 as actually seen by the viewer. The timing of light emission is also the same, and therefore, the shift in the outline caused during rewriting of signals is always in the same place, and thus, the shift in the outline is easily discernible by the viewer.

The present invention is provided in view of these problems. That is to say, an object of the invention is to provide a display device using self-luminous elements where different triangular waves are inputted column by column, and thus, signals are rewritten and light is emitted with different timing in the drive for controlling the time for light emission, where rewriting of signals and light emission are carried out separately within each horizontal period, and thus, the shift in the outline is prevented from remaining in the same place, so that it becomes difficult for the viewer to see the shift in the outline of moving images.

One embodiment of the present invention provides a signal line driving circuit (also referred to as data line driving circuit) for applying a signal voltage corresponding to display data to signal lines (column direction), a triangular wave generating circuit for generating different types of triangular waves having different phases and waveforms, a triangular wave selecting circuit for selecting one from among a number of types of triangular waves generated by the triangular wave generating circuit for each signal line, and a signal line switching circuit for switching the signal voltage and the triangular wave selected and outputted by the triangular wave selecting circuit. In image display devices having this configuration, each horizontal period is divided into a signal write-in period and a triangular wave period, so that the signal voltage and the triangular wave are outputted during the signal write-in period and the triangular wave period, respectively. Different triangular waves are selected and outputted for each signal line (each column), and thus, it becomes possible to change the place where there is a shift in the outline in moving images for each column.

The present invention provides an image display device using self-luminous elements having effects of making it difficult for the place where there is a shift in the outline in moving images to be seen by the viewer by changing it for each line.

BRIEF DESCRIPTION OF THE DRAWINGS

These and other features, objects and advantages of the present invention will become more apparent from the following description when taken in conjunction with the accompanying drawings, wherein.

DESCRIPTION OF THE EMBODIMENTS

Figure 1:
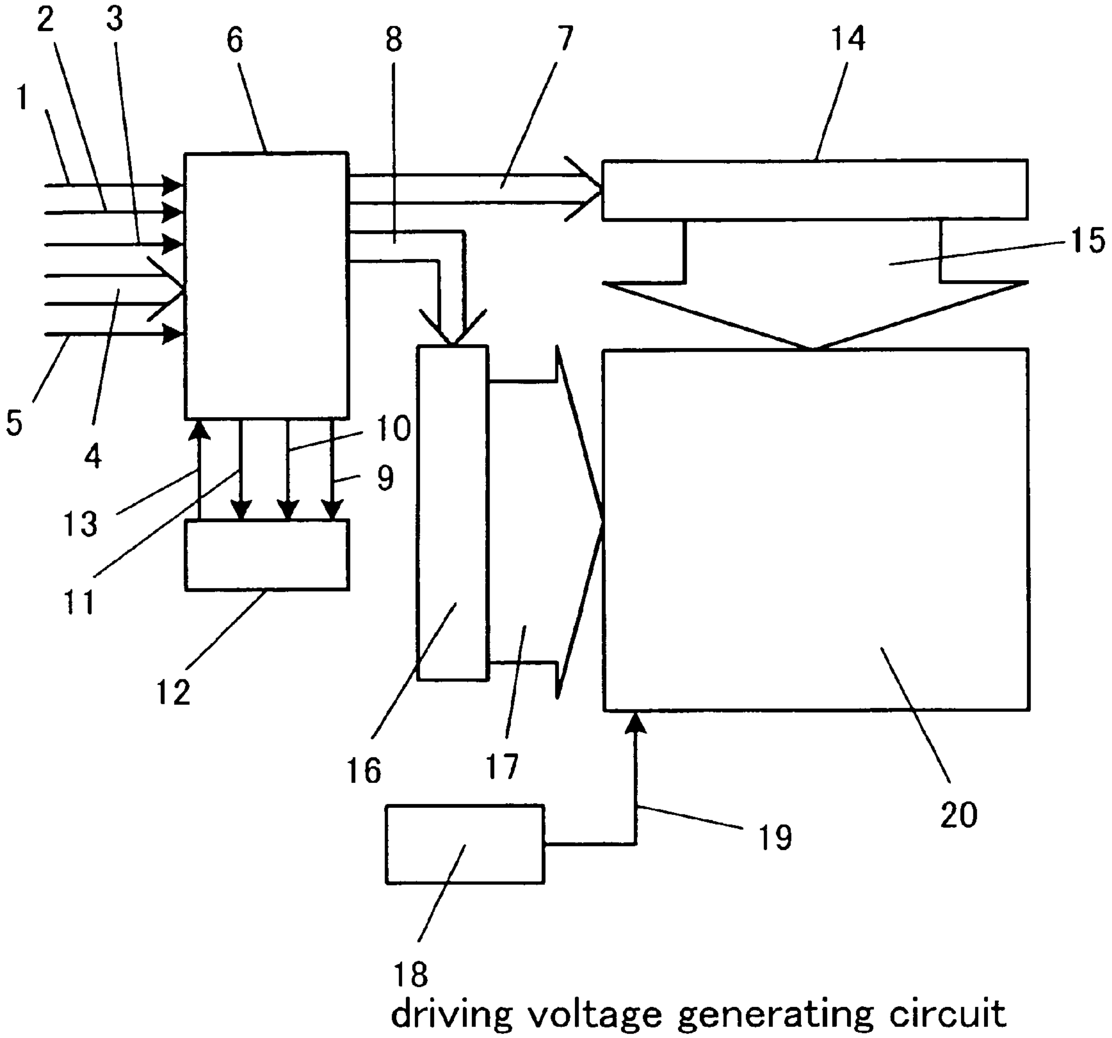
FIG. 1 is a diagram showing the configuration of an image display device using self-luminous elements according to one embodiment of the present invention.

In the following, one embodiment of the present invention is described in detail in reference to the drawings. FIG. 1 is a diagram showing the configuration of an image display device using self-luminous elements according to one embodiment of the present invention. In FIG. 1, the symbol 1 is a vertical sync signal, 2 is a horizontal sync signal, 3 is a data enabling signal, 4 is display data, and 5 is a sync clock. The vertical sync signal 1 is a signal for one screen period (one frame period) of display, the horizontal sync signal 2 is a signal for one horizontal period, and the data enabling signal 3 is a signal indicating the period during which the display data 4 is effective (effective display period), and all signals are inputted in sync with the sync clock 5.

In the present embodiment, the display data for one screen is transferred in sequence in a raster scan format, starting from the pixel in the upper left, and in the following description, information for one pixel consists of six bit digital data. The symbol 6 is a display controlling portion, 7 is a data line controlling signal, 8 is a scanning line controlling signal, 9 is a storing circuit controlling signal, 10 is a storing circuit controlling address, 11 is storage data, 12 is a horizontal image storing circuit, and 13 is read-out data. The display controlling portion 6 generates a storage circuit controlling signal 9 for once storing display data 4 for at least one horizontal line for self-luminous element display (described below) in a horizontal image storing circuit 12 which can store the display data 4 as a write-in controlling signal, and a storage circuit controlling address 10 as a write-in address, and outputs these together with the storage data 11.

In addition, the storage circuit controlling signal 9 is generated as a read-out controlling signal, and the storage circuit controlling address is generated as a read-out address, in order to read out the storage data 11 as read-out data 13 with the display timing of the self-luminous element display, and the signal and the address are outputted as the data line controlling signal 7 and the scanning line controlling signal 8 together with the read-out data 13. In the present embodiment, the horizontal image storing circuit 12 stores and reads out display data for one line as in the following description.

The symbol 14 is a data line driving circuit, 15 is a data line driving signal, 16 is a scanning line driving circuit, 17 is a scanning line driving signal, 18 is a luminous voltage generating circuit, 19 is a self-luminous element luminous voltage, and 20 is a self-luminous element display. The self-luminous element display 20 is a display using light emitting diodes and organic EL's as display elements, and has a number of self-luminous elements (pixels provided in a matrix). In the display operation of the self-luminous element display 20, a signal voltage in accordance with the data line driving signal 15 outputted from the data line driving circuit 14 to a pixel on the line selected by the scanning line driving signal 17 outputted from the scanning line driving circuit 16 and a triangular wave signal are applied to a pixel on the line selected by the scanning line driving signal 17 outputted from the scanning line driving circuit 16, so that the time for light emission is controlled.

Self-luminous elements emit light in accordance with the controlled time when the self-luminous element luminous voltage 19 is applied. Here, the data line driving circuit 14 and the scanning line driving circuit 16 may be implemented with separate LSI's or implemented in one LSI. In addition, they may be formed on the same glass substrate together with the pixel portion. In the present embodiment, the self-luminous element display 20 has a resolution of 240×320 dots.

Figure 2:
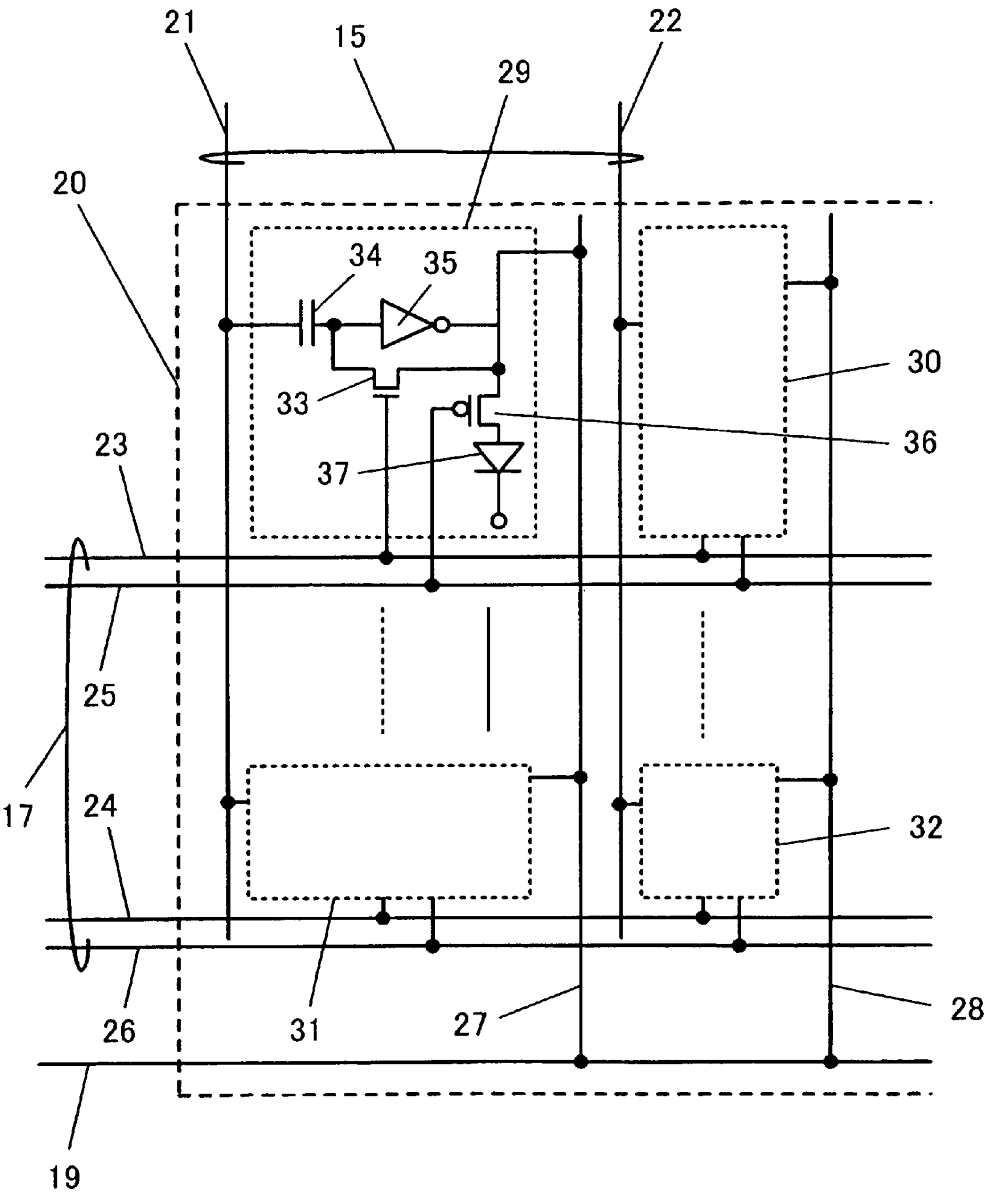
FIG. 2 is a circuit diagram showing an example of the internal configuration of the self-luminous element display in FIG. 1.

FIG. 2 is a circuit diagram showing an example of the internal configuration of the self-luminous element display 20 in FIG. 1, and shows an example of a case where organic EL elements are used as self-luminous elements. In FIG. 2, symbol 21 is a first data line, 22 is a second data line, 23 is a first scanning line, 24 is the 320$^{th}$ scanning line, 25 is the first light emission controlling line, 26 is the 320$^{th}$ light emission controlling line, 27 is a first column luminous voltage supplying line, 28 is the second column luminous voltage supplying line, 29 is the first row, first column pixel, 30 is the first row, second column pixel, 31 is the 320$^{th}$ first column pixel, and 32 is the 320$^{th}$ row, second column pixel. A signal voltage and a triangular wave are supplied to a pixel in the row selected by the scanning lines via each data line, so that the time for emitting light is controlled in accordance with the relationship between the signal voltage and the triangular wave.

Here, the configuration inside a pixel is shown only for the first row, first column pixel 29, but other pixels, including the first row, second column pixel 30 (and all other pixels, including those not shown) have the same configuration. The symbol 33 is a reset switch, 34 is a write-in capacitor, 35 is a driving inverter, 36 is a light emission controlling switch, and 37 is an organic EL. The reset switch 33 is made of an "on" state by means of the first scanning line 23, so that input into or output from the driving inverter 35 is connected, and therefore, a reference voltage in accordance with the properties of the transistors for forming a drive inverter 35 for each pixel is set, and with this as a reference, a signal voltage from the first data line 21 is stored in the write-in capacitor 34.

The output of the drive inverter 35 becomes of a "low" state when the triangular wave inputted after write-in of the signal voltage is higher than the signal voltage stored in the write-in capacitor 34, and becomes of a "high" state when it is lower than the signal voltage, and the organic EL 37 emits light when the light emission controlling switch 36 is converted to the "on" state for all of the pixels, when the triangular wave is inputted. In addition, as described above, the number of pixels in the self-luminous display 20 is 240×320, and thus, 320 scanning lines, which are lines in the horizontal direction, are aligned in the vertical direction from the first scanning line 23 to the 320$^{th}$ scanning line 24, while 720 data lines (each pixel is formed of three dots: R, G and B), which are lines in the vertical direction, are aligned in the horizontal direction from the first data line 21 the second data line 22 to the 720$^{th}$ data line (not shown) as in the description below.

Furthermore, the self-luminous element voltage 19 is supplied to the self-luminous element display 20 from beneath, and 720 lines, including the first column luminous voltage supplying lines 27, which are lines in the vertical direction (column direction), the second column luminous voltage supplying line 28 to the 720$^{th}$ column luminous voltage supplying line.

Figure 3:
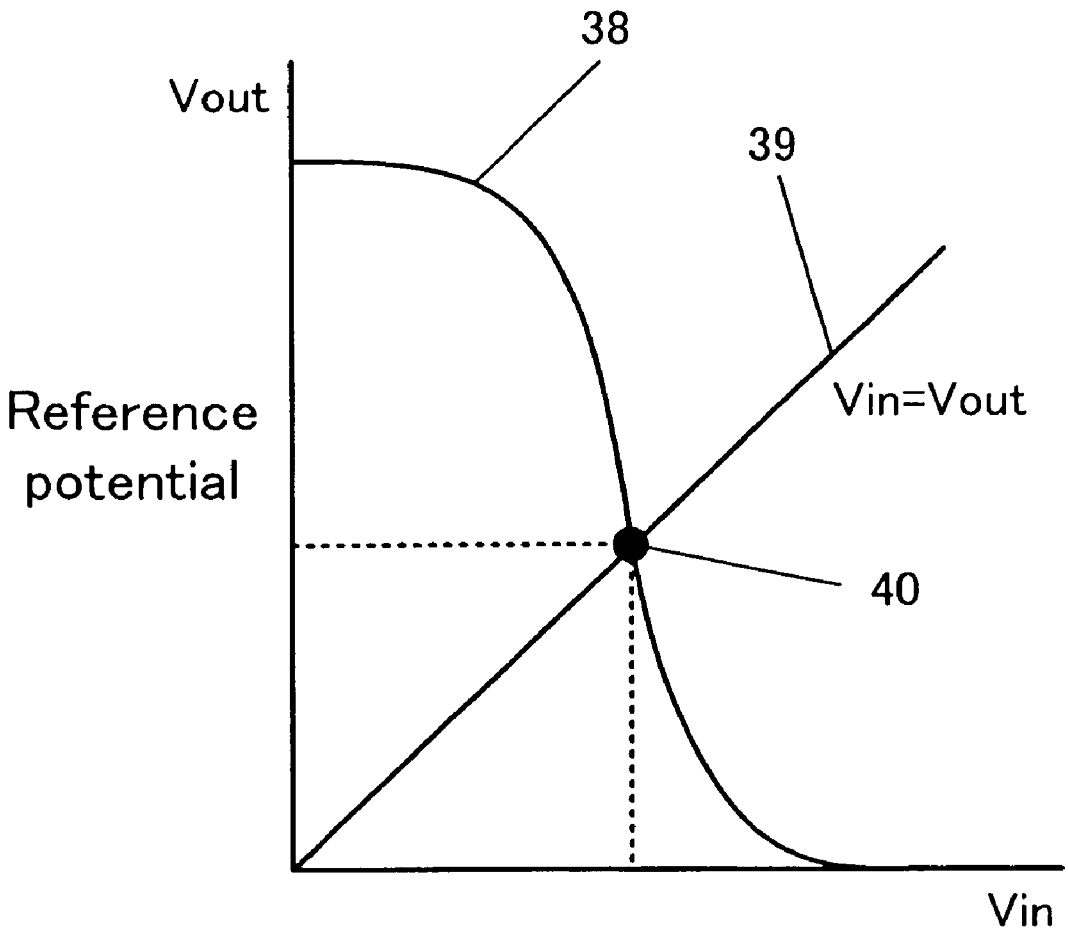
FIG. 3 is a graph illustrating the setting for the reference voltage for a signal voltage in the drive inverter in FIG. 2.

FIG. 3 is a diagram illustrating the setting of a reference voltage for the signal voltage in the driving inverter 35 in FIG. 2. In FIG. 3, the symbol 38 is the input/output properties of the driving inverter 35, 39 is a condition for connecting input/output, 40 is a reference potential for writing in a signal voltage in the driver inverter 35, and input and the output of the driving transistor 35 are connected when data is written in, and therefore, the potential of the input and the output becomes the signal voltage write-in reference potential 40, which is an intersection for the condition for connecting input/output 39 indicated by the input/output properties 38 and the straight line of Vin=Vout. The signal voltage is written in with this signal voltage write-in reference voltage 40 as the reference.

Figure 4:
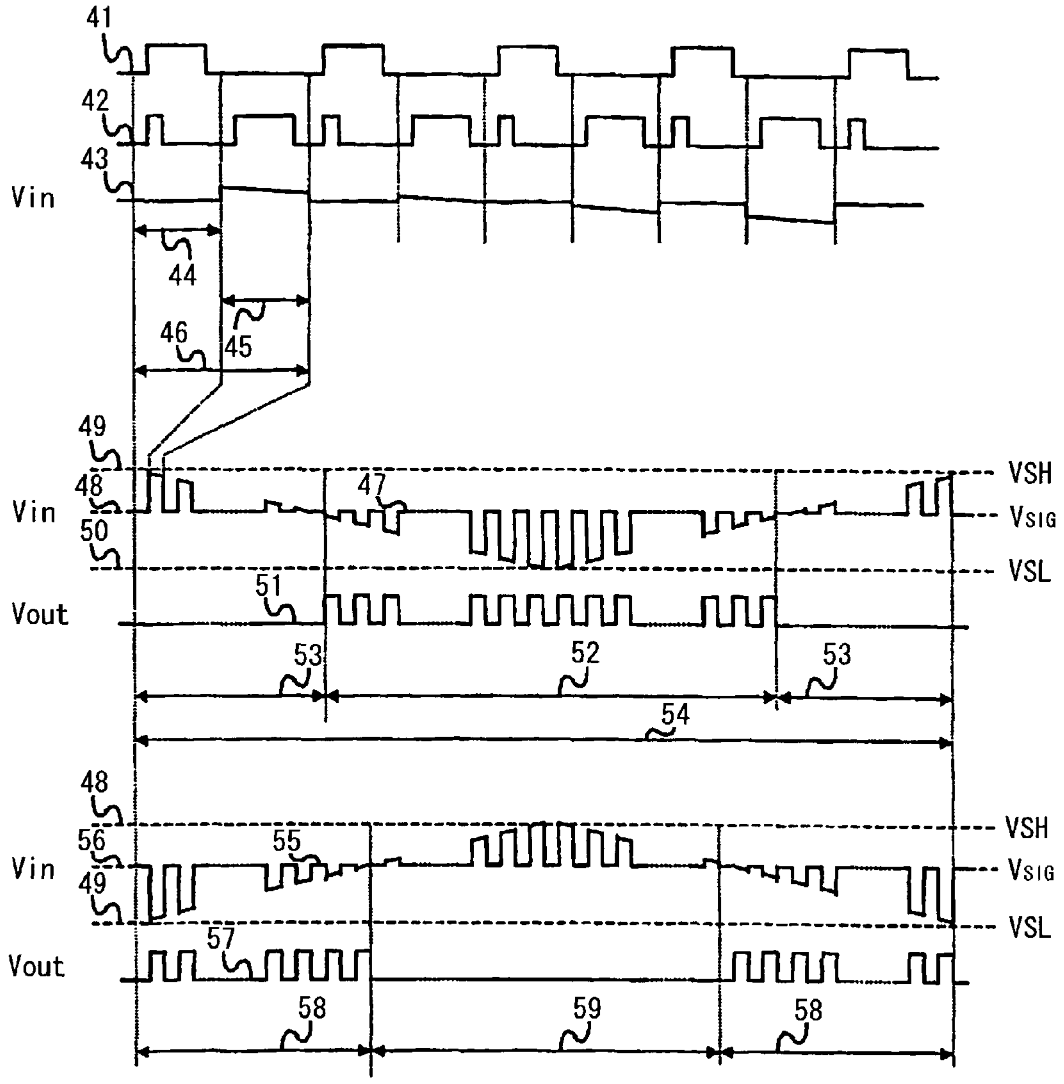
FIG. 4 is a waveform diagram showing signal voltage write-in and the operation of lighting time control using triangular waves.

FIG. 4 is a waveform diagram showing the signal voltage write-in and the operation of the lighting time control using a triangular waveform. In FIG. 4, the symbol 41 is a reset pulse, 42 is a light emission controlling pulse, 43 is an input into the driving inverter (Vin), 44 is the data write-in period(for one line), 45 is a triangular wave write-in period(for one line), and 46 is one horizontal period. In the write-in operation according to the present embodiment, each horizontal period 46 is divided into a data write-in period 44 and a triangular wave write-in period 45, so that the reset pulse 41 is set to the "high" state during the data write-in period 44 and the reset switch 33 is set to the "on" state, while the light emission controlling pulse 42 is converted to the "high" state and the light emission controlling switch 36 is set to the "on" state.

During the triangular wave write-in period 45, only the light emission controlling pulse 44 is set to the "high" state. The symbol 47 is an odd number column driving inverter input, 48 is an odd column driving inverter threshold voltage, 49 is a triangular wave high voltage (VSH), 50 is a triangular wave low voltage (VSL), 51 is an odd column driving inverter output (Vout), 52 is the odd column light emission period, 53 is the odd column non-light emitting period, and 54 is one frame period. The odd column driving inverter input 47 provides a signal voltage (Vsig) during the data write-in period 44, and provides an odd column driving inverter threshold voltage 48 with the properties of the driving inverter 35 and the organic EL 37 as a reference by setting the reset pulse 41 and the light emission controlling pulse 42 to the "high" state.

During the triangular wave write-in period 45, the voltage of the triangular wave written in drops from the triangular wave high voltage 49 to the triangular wave low voltage 50 over a number of lines, and rises again to the triangular wave high voltage 49. In the present embodiment, the triangular wave changes from the triangular wave high voltage 49 to the triangular wave low voltage 50 and the triangular wave high voltage 49 during the period of each frame period 54, and each frame period 54 is one period (approximately 16.7 ms) of a frequency of 60 Hz in the following description.

Here, during the triangular wave write-in period 45, the odd column driving inverter output 51 becomes "1" during the period when the level of the triangular wave is lower than the odd column driving inverter threshold voltage 48 (odd column light emission period 52) and "0" during the period when the level is higher (odd column non-light emission period 53). At this time, the light emission controlling pulse 42 becomes of the "high" state during the triangular wave write-in period 45, and the light emission controlling switch 36 becomes of the "on" state, and therefore, the organic EL 37 emits light during the triangular wave write-in period 45 of the odd column light emission period 52. The symbol 55 is an even column driving inverter input, 56 is an even column driving inverter threshold voltage, 57 is an even column driving inverter output (Vout), 58 is an even column light emission period, and 59 is an even column non-light emission period.

The even column driving inverter input 55 also provides a signal voltage (Vsig) during the data write-in period 44, in the same manner as the odd column driving inverter input 47, and when the reset pulse 41 and the light emission controlling pulse 42 are set to the "high" state, the even column driving inverter threshold voltage 56 is provided with the properties of the driving inverter 35 and the organic EL 37 as a reference. In the present embodiment, the odd column driving inverter threshold voltage 48 and the even column driving inverter threshold voltage 56 are the same when the display is all white in the following description.

During the triangular wave write-in period 45, the voltage of the triangular wave which written in rises from the triangular wave low voltage 50 to the triangular wave high voltage 49 over a number of lines and drops again to the triangular wave low voltage 50. In the present embodiment, the triangular wave changes from the triangular wave low voltage 30 to the triangular wave high voltage 49 and the triangular wave low voltage 50 during the period of one frame period 54, that is to say, the phase becomes opposite to the triangular wave in the odd columns as in the following description. Here, like the odd columns, during the triangular wave write-in period 45, the even column driving inverter output 57 becomes "1" during the period when the level of the triangular wave is lower than the even column driving inverter threshold voltage 56 (even column light emission period 58), and "0" during the period when the level is higher (even column non-light emission period 59). Accordingly, in the even columns, the organic EL's 37 emit light in the opposite phase from in the odd columns.

Figure 5:
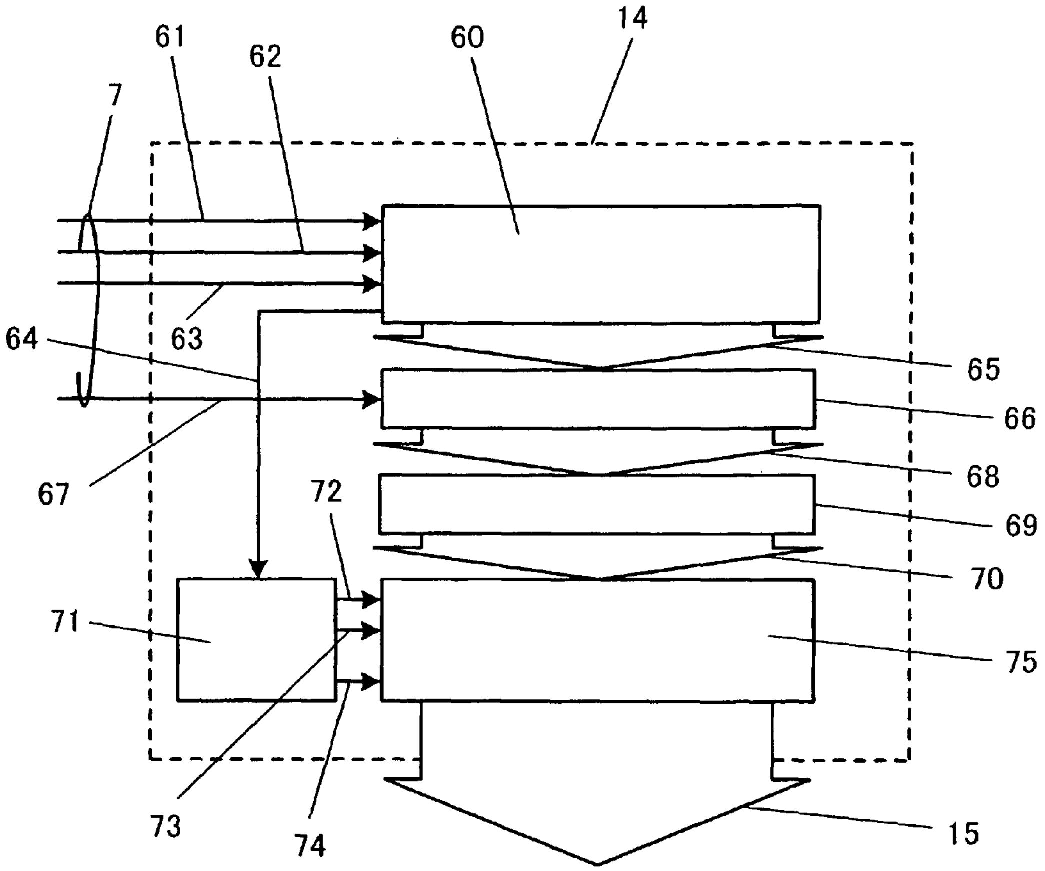
FIG. 5 is a block diagram showing an example of the internal configuration of the data line driving circuit in FIG. 1.

FIG. 5 is a block diagram showing an example of the internal configuration of the data line driving circuit 14 in FIG. 1. In FIG. 5, the symbol 60 is a data shift circuit, 61 is a data starting signal, 62 is a data clock, 63 is display serial data, 64 is a horizontal retrace period signal, and 65 is display shift data, and the data shift circuit 60 follows the data clock 62 and takes in the display serial data 63 for one line into one horizontal period as a reference for the start of taking in of the data starting signal 61, and outputs the display shift data 65.

The symbol 66 is one line latch circuit, 67 is a horizontal latch clock, and 68 is one line latch data, and the one line latch circuit 66 latches the display shift data 65 for one line and outputs it as the one line latch data 68 in sync with the horizontal latch clock 67, and at the same time outputs the horizontal retrace period signal 64 indicating the period during which the one line latch data 68 is not outputted. The symbol 69 is a gradation voltage selecting circuit, and 70 is one line display data. The gradation voltage selecting circuit 69 selects one level from among the gradation voltages for 64 levels in accordance with the one line latch data and outputs it as one line display data 70.

The symbol 71 is a triangular wave generating circuit, 72 is a first triangular wave signal, 73 is a second triangular signal, and 74 is a triangular wave switching signal, and the triangular wave generating circuit 71 generates a first triangular wave signal 72 with one frame period as one period and a second triangular was signal 73 with the same period and a different phase, and generates a triangular wave switching signal 74 indicating the timing with which the generated triangular waves are outputted to a data line. As described above, in the present embodiment, the phase of the triangular waves is opposite between odd columns and even columns, the first triangular wave signal 72 is outputted to a data line of an odd column and the second triangular wave signal 72, of which the phase is opposite, is outputted to a data line of an even column in the following description. The symbol 75 is a gradation voltage-triangular wave switching circuit which follows the triangular wave switching signal 74 and switches the one line display data 70 and the first triangular wave signal 72 in the odd columns and switches the one line display data 70 and the second triangular wave signal 73 in the even columns, and thus outputs the results as a data line drive signal 15.

Figure 6:
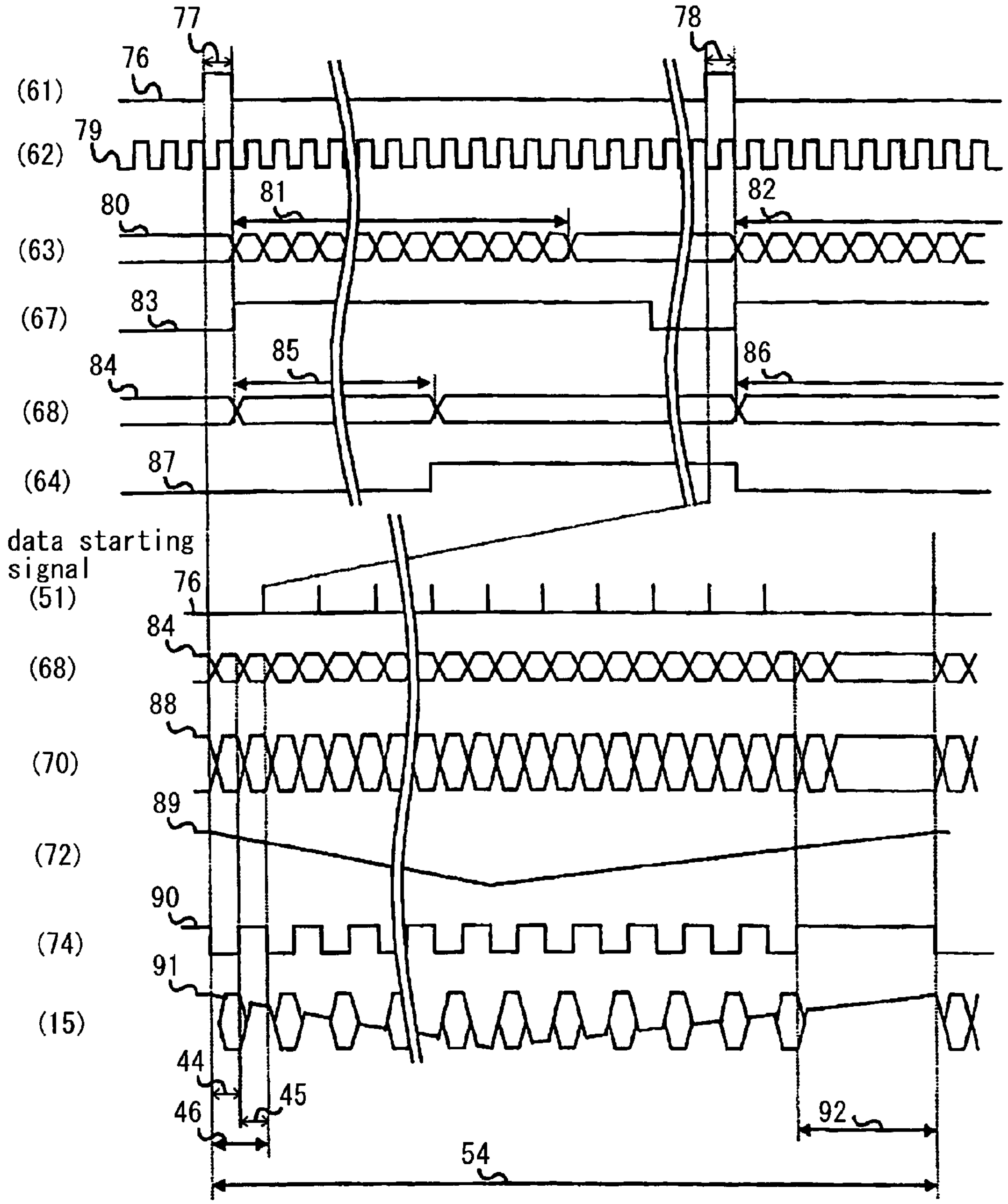
FIG. 6 is a waveform diagram showing the drive operation of odd column data lines in the data line driving circuit in FIG. 5.

FIG. 6 is a waveform diagram showing the drive operation of odd column data lines in the data line driving circuit 14 in FIG. 5. In FIG. 6, the symbol 76 is a data starting signal waveform, 77 is n line data starting timing, 78 is n+1 line data starting timing, 79 is a data clock waveform, 80 is a display serial data waveform, 81 is n line display serial data, 82 is n+1 line display serial data, 83 is a horizontal latch clock waveform, 84 is a one line latch data waveform, 85 is n−1 line latch data, and 86 is n line latch data.

The display serial waveform 80 is taken in according to the data clock waveform 79 with the timing with which the data starting timing is "high" as a reference. For example, the n line display serial data 81 starts taking in at the rise of the next data clock waveform 79 of the n line data starting time 77. After all the data for one line is taken in, the one line latch data waveform 84 is outputted at the rise of the horizontal latch clock waveform 83. For example, the n line display serial data 81 is outputted as the n line latch data 86 at the rise of the horizontal latch clock waveform 83 after the completion of taking in of all of the data. FIG. 6 also shows expanded time axes.

The symbol 87 is a horizontal retrace period signal waveform, 88 is a one line display data waveform, 89 is a first triangular wave signal waveform, 90 is a triangular wave switching signal waveform, 91 is an odd column data line driving signal waveform, and 92 is the vertical retrace triangular wave write-in period. The triangular wave switching signal waveform 90 becomes "high" after the one line latch data waveform 84 for one horizontal line is outputted, for example after the n−1 line latch data 85 is outputted, and the first triangular wave signal waveform 89 is then outputted. Accordingly, the odd column data line driving signal waveform 91 outputs the one line display data waveform 84 during the data write-in period 44 and the first triangular wave signal waveform 89 during the triangular wave write-in period 45. In addition, in the present embodiment, the vertical retrace period within each frame period 54 is also regarded as the vertical retrace triangular wave write-in period 92 for outputting a triangular wave in the following description.

Figure 7:
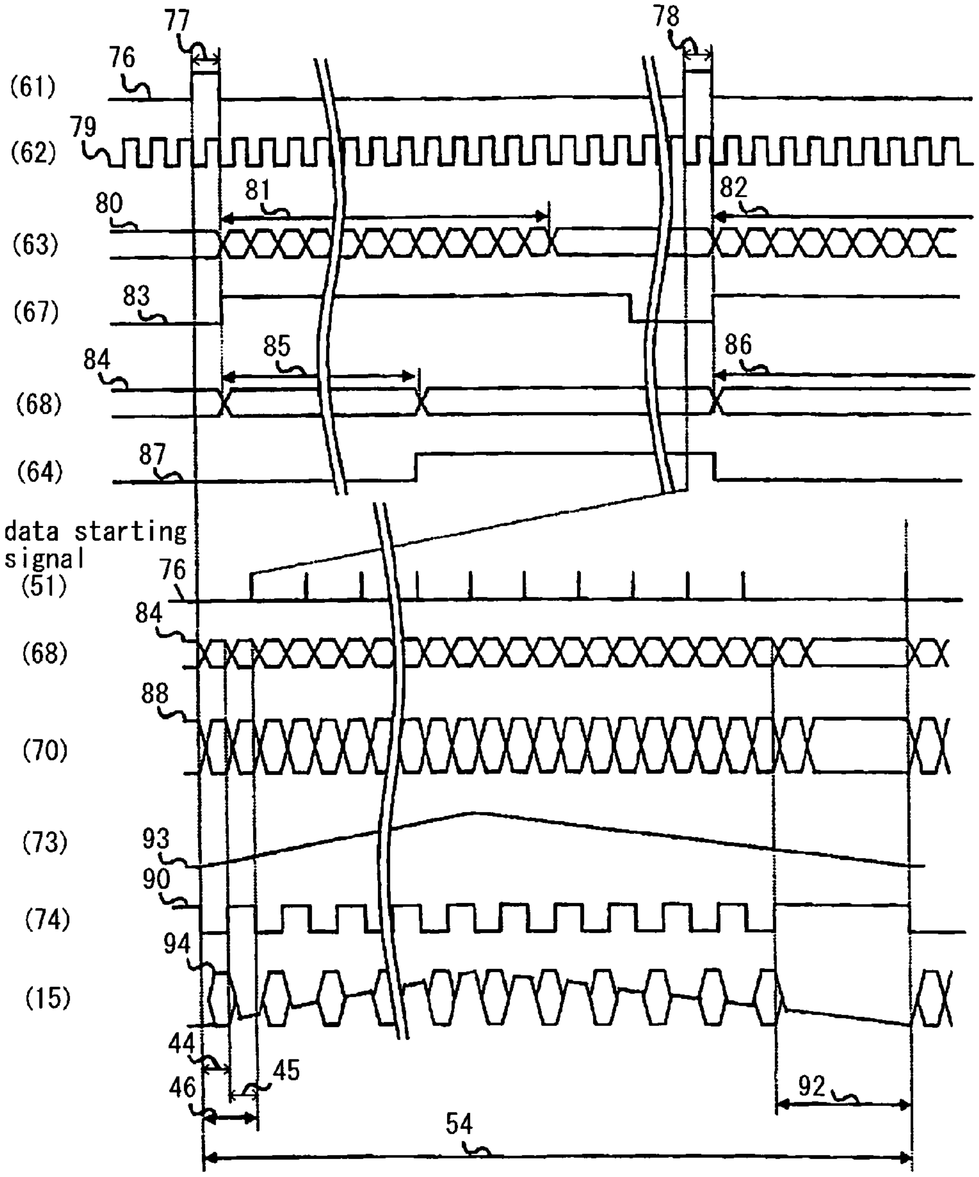
FIG. 7 is a waveform diagram showing the drive operation of even column data lines in the data line driving circuit in FIG. 5.

FIG. 7 is a waveform diagram showing the driving operation of the even column data lines in the data line driving circuit 14 in FIG. 5. In FIG. 7, symbols which are the same as in FIG. 6 are parts which operate in the same manner as in the odd columns. The symbol 93 is a second triangular wave signal waveform, and 94 is an even column data line driving signal waveform. As with the operation in the odd columns, the triangular wave switching signal waveform 90 becomes "high" after the one line latch data waveform 84 for one horizontal line is outputted, for example after the n−1 line latch data 85 is outputted, and the second triangular wave signal waveform 93 is outputted during this period. Accordingly, the even column data line driving signal waveform 94 outputs a one line display data waveform 84 during the data write-in period 44 and the second triangular wave signal waveform 93 during the triangular wave write-in period 45.

Figure 8:
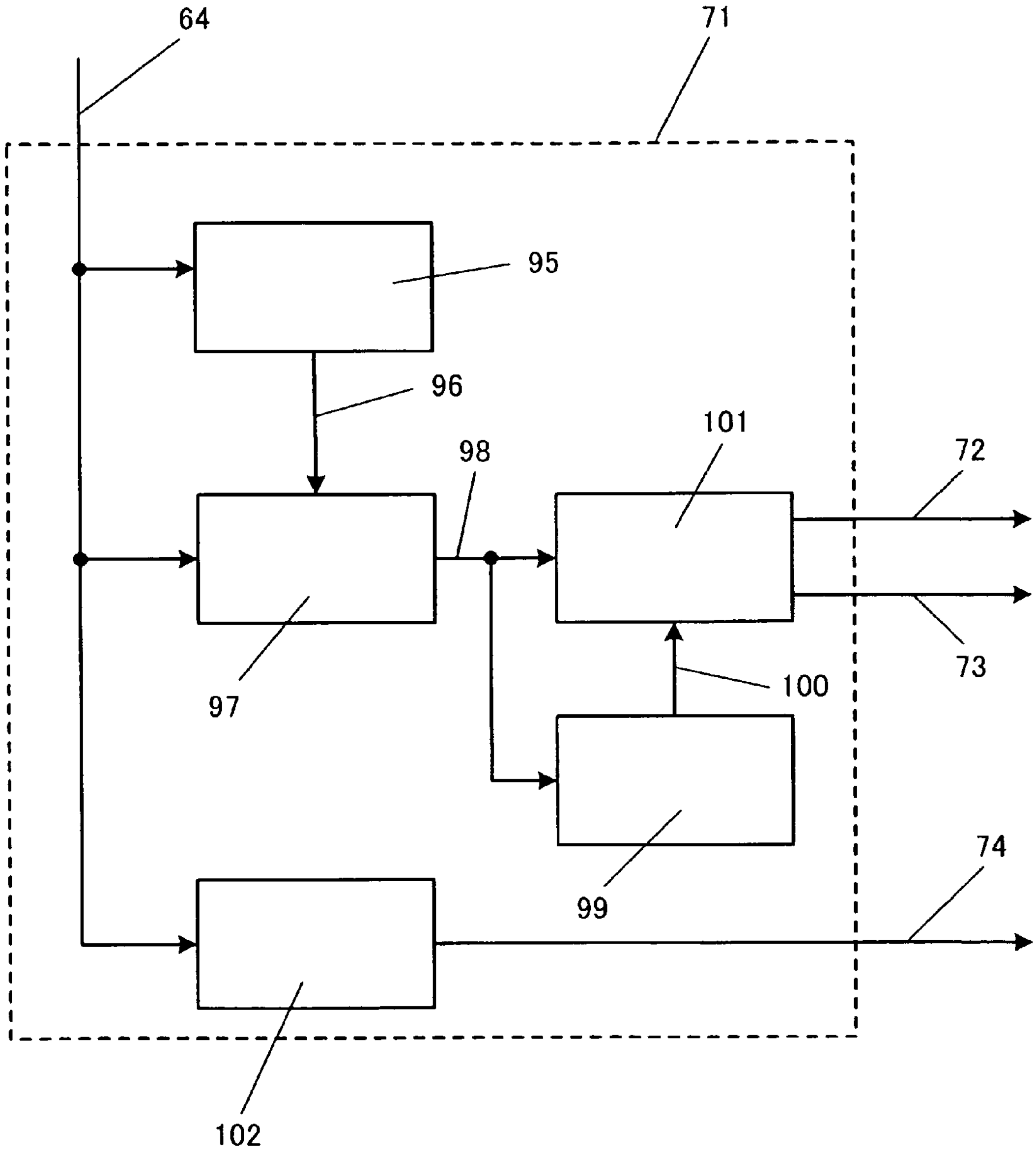
FIG. 8 is a block diagram showing an example of the internal configuration of the triangular wave generating circuit in FIG. 5.

FIG. 8 is a block diagram illustrating an example of the internal configuration of the triangular wave generating circuit 71 in FIG. 5. In FIG. 8, the symbol 95 is a reference clock generating circuit, 96 is a reference clock, 97 is an up-down counting circuit, 98 is a first counting output, 99 is a phase adjusting circuit(inverting circuit), 100 is a second counting output, 101 is a digital/analog converting circuit, and 102 is a triangular wave switching signal generating circuit. The reference clock generating circuit 95 generates a reference clock 96 for generating a first triangular wave signal 72 and a second triangular wave signal 73. The up-down counting circuit 97 synchronizes the reference clock 96 and then counts down to "0" from the initial value, and after that counts up to the original initial value and outputs the first counting output 98. The phase adjusting circuit 99 shifts the phase of the first counting output 98 arbitrarily and outputs the results as the second counting output 100.

Here, in the present embodiment, the initial value is "63," which is the maximum value for the six bit data, as with the display data, the first counting output 98 and the second counting output 100 are also six bit digital data, and the phase of the second triangular wave signal 73 is opposite to that of the first triangular wave signal 72 and the second counting output 100 is the inverted output of the first counting output 98 in the following description.

Figure 9:
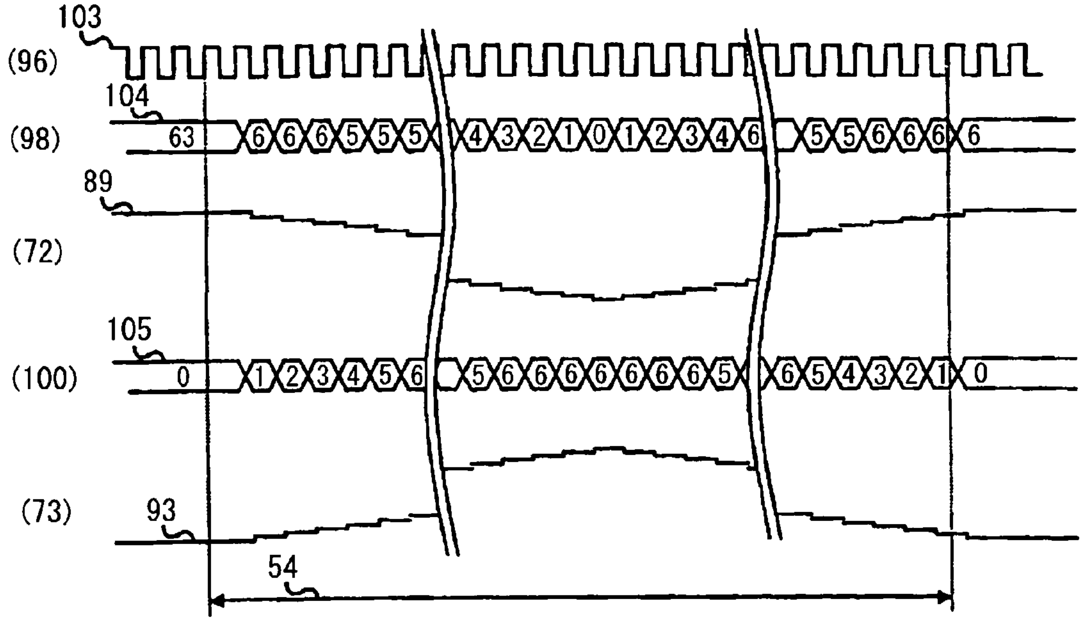
FIG. 9 is a waveform diagram showing the operation of the reference clock generating circuit, the up-down count circuit, the phase adjusting circuit and the digital/analog converting circuit in FIG. 8.

FIG. 9 is a waveform diagram showing the operation of the reference clock generating circuit 95, the up-down counting circuit 97, the phase adjusting circuit 99 and the digital/analog converting circuit 101 in FIG. 8. In FIG. 9, the symbol 103 is a reference clock waveform, 104 is a first count output waveform, and 105 is a second counting output waveform. The reference clock waveform 103 is a clock having at least a number of clocks which are required for the up-down counting circuit 97 to count down from the initial value "63" to "0" and after that count up to "63" during each frame period 54.

The first count output waveform 104 follows the rise in the reference clock waveform 103 and starts counting down from the initial value "63" following the rise in the reference clock waveform 103, and counts up to the original initial value "63" once the count becomes "0." The second count output waveform 105 is outputted after the phase is inverted in the phase adjusting circuit 99, and thus, follows the rise in the reference clock waveform 103 and starts counting up from the initial value "0," and counts down to "0" once the count becomes "63." The first triangular wave signal waveform 89 and the second triangular wave signal waveform 93 provide waveforms gained by converting the first count outputting waveform 104 and the second count outputting waveform 105, which are six bit digital data between "0" and "63," to analog values with the lowest level "0" and the highest level "63."

Figure 10:
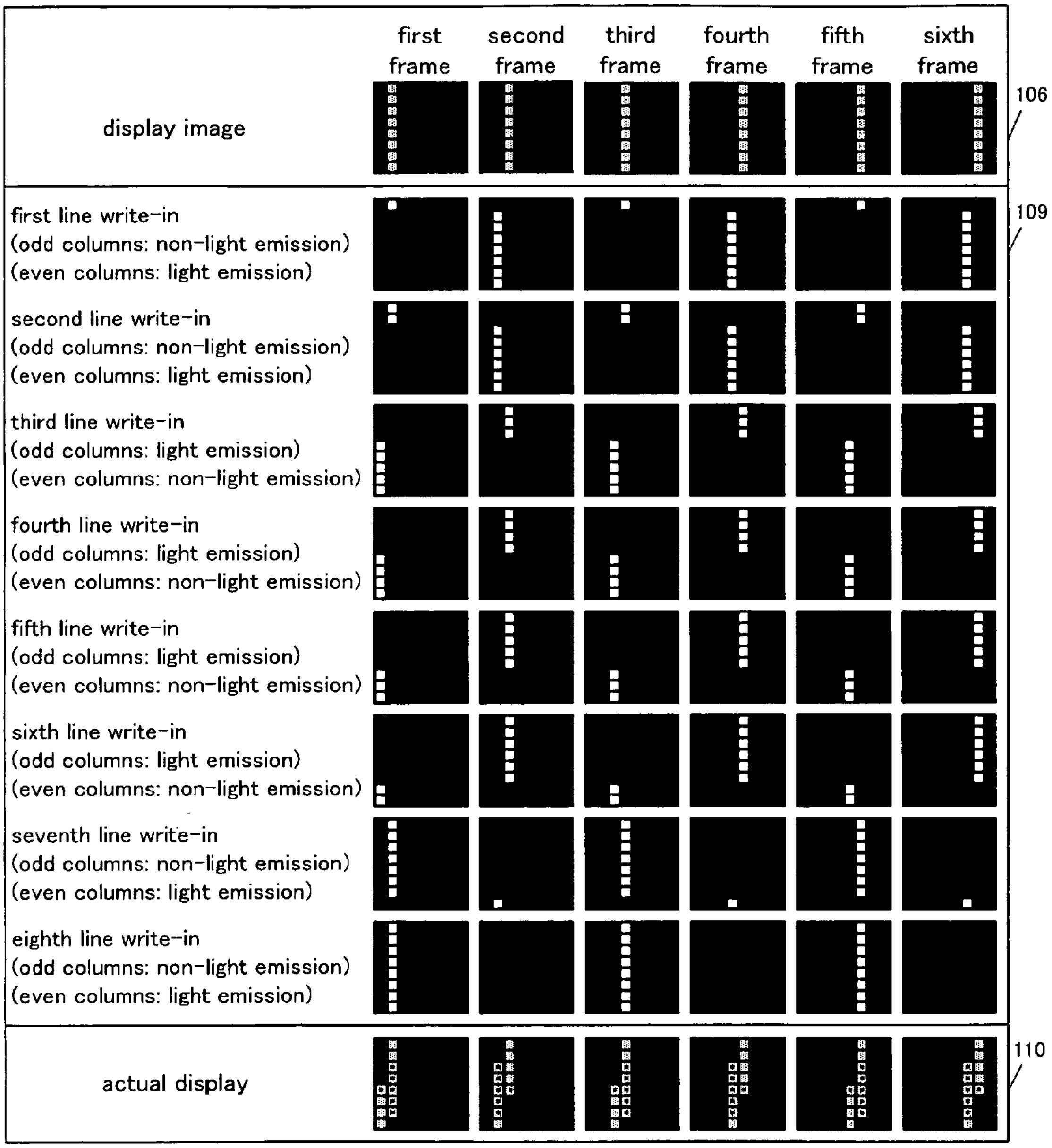
FIG. 10 is a diagram showing the timing of signal rewriting and light emission in the case where display with middle gradation of one longitudinal line shifts laterally.
Figure 11:
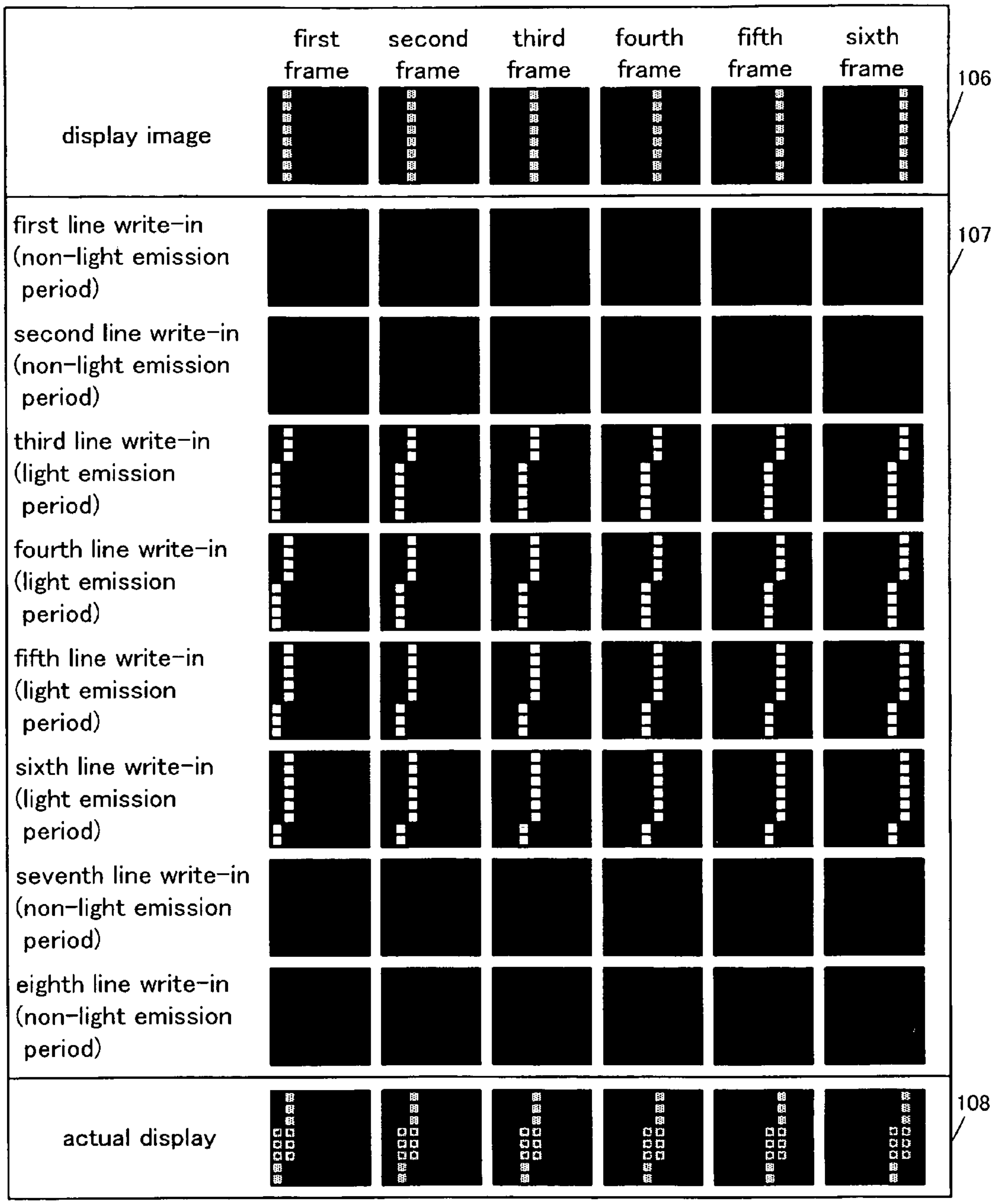
FIG. 11 is a diagram showing the timing of signal rewriting and light emission according to the prior art in the case where one longitudinal line is displayed while shifting laterally.

FIG. 10 is a diagram showing the timing with which a signal is rewritten and light is emitted in the case where the middle gradation display of one longitudinal line is moved laterally. In FIG. 10, the symbol 106 is a display video (same as in FIG. 6), 109 is write-in-light emission timing at the time of a phase shift, and 110 is a real display at the time of a phase shift. The write-in-light emission timing 109 at the time of a phase shift shows the chronological transition of the state of light emission in the case where the phase for repeating write-in and light emission during each horizontal period is different between odd columns and even columns for the input of a video where a vertical line shifts to the right. The chronological integral calculus of this state of light emission is the state of the real display 110 when the phase shifts so as to be visible to the viewer. The timing with which light is emitted differs between odd columns and even columns, and therefore, the shift in the outline caused by write-in of the signal differs for each frame, and thus, it becomes difficult for the shift in the outline to be seen as a blur by the viewer.

In the following, the operation for preventing the shift in the outline of a moving image in the present embodiment is described in reference to FIGS. 1 to 9 and 11. First, the flow of display data is described in reference to FIG. 1. In FIG. 1, the display controlling portion 6 once stores display data 4 for each horizontal line in the horizontal image storing circuit 12 as storage data 11. Then, display data is read out from the horizontal image storing circuit 12 as readout data 13 in accordance with the display timing of the self-luminous element display 20, and a data line controlling signal 7 and a scanning line controlling signal 8 are generated.

The horizontal image storing circuit 12 is used in order to prolong the horizontal retrace period of the inputted display data 4 in the present embodiment, and it is possible to omit it in the case where the horizontal retrace period of the display data 4 is sufficiently long (≧50%). The data line driving circuit 14 converts the data line controlling signal 7, which includes six bit gradation information, to a signal voltage for displaying pixels on the self-luminous element display 20, and at the same time generates a triangular wave during the horizontal retrace period and outputs it as the data line driving signal 15. The details are given below.

The scanning line driving circuit 16 selects scanning lines for displaying an image on the self-luminous element display 20 in sequence, and at the same time generates a signal for controlling write-in within pixels for each scanning line and outputs the signal as a scanning line driving signal 17. The details are given below. The drive voltage generating circuit 18 generates a self-luminous element luminous voltage 19 which becomes a driving voltage for lighting self-luminous elements. Finally, pixels on a scanning line selected by the scanning line driving signal 17 on the self-luminous element display 20 are turned on, following the signal voltage outputted as a data line driving signal 15, a triangular wave signal and a self-luminous element luminous voltage 19. The details are given below.

The operation of turning on the self-luminous element display 20 in FIG. 1 is described in detail in reference to FIGS. 2 to 4. In FIG. 2, when the reset switch 33 is converted to an on state via the first scanning line 23, the input/output of the driving inverter 35 are connected, and therefore, the signal voltage write-in reference potential 40 becomes the middle potential of the input/output potential difference of the driving inverter 35 following the properties shown in FIG. 3. At this time, the signal voltage of the data is stored in the write-in capacitor 34 via the first data line 21 with the signal voltage write-in reference potential 40 as a reference, and then becomes of the odd column driving inverter threshold voltage 48 shown in FIG. 4.

In FIG. 2, the driving inverter 35 outputs "low" in the case where the input voltage is higher than the threshold voltage, and outputs "high" in the case where the input voltage is lower than the threshold voltage. Accordingly, as shown in FIG. 4, a triangular wave is inputted via the first data line 21 during the horizontal retrace period, and thus, the odd column driving inverter output 51 becomes "low" during the non-light emitting period 53, when the voltage level of the triangular wave is higher than the odd column driving inverter threshold voltage 48, and becomes "high" during the light emitting period 52, when the level is lower than the threshold voltage. In addition, though the operation of write-in of the signal voltage for even column pixels is the same as in the odd columns, the phase of the triangular wave inputted via the second data line 22 during the horizontal retrace period is opposite to that of the triangular wave inputted via the first data line, as shown in FIG. 4, and therefore, the relationship between the light emitting period 52 and the non-light emitting period 53 is different from in the odd columns. In addition, in FIG. 2, the organic EL 37 is not turned on when the output of the driving inverter 35 is "low," and is turned on when the output is "high" and the light emission controlling switch 36 is "high," and light is emitted when the organic EL is turned on, when a driving current flow through in accordance with the self-luminous element luminous voltage 19.

As described above, gradation display is carried out by chronologically controlling light emission and non-light emission in accordance with the signal voltage. Here, the driving inverter 35 is indicated by a logic circuit symbol, and generally formed of CMOS transistors. Here, the configuration is not limited, as long as the inverter has the properties shown in FIG. 3.

The operation of the data line driving circuit 14 outputting a triangular wave signal during the horizontal retrace period is described in detail in reference to FIGS. 5 to 7. In FIG. 5, the data shift circuit 60 latches the display serial data 63 in accordance with the data starting signal 61 and the data clock 62 and outputs the results as display shift data 65. As shown in FIGS. 6 and 7, the display serial data 63 is taken in at the rise of the data clock 62 with the data starting signal 62 as a starting reference. In FIG. 5, the one line latch circuit 66 latches the display shift data 65 taken in by the data shift circuit 60 in accordance with the horizontal latch clock 67 and outputs the results as one line latch data 68, and outputs a horizontal retrace period signal 64 during the period when one line latch data is not outputted.

As shown in FIGS. 6 and 7, one line latch data 68 is outputted in accordance with the timing with which the horizontal latch clock 67 rises, and sets the horizontal retrace period signal 62 to "high" during the period when the one line latch data is not outputted. In FIG. 5, the gradation voltage selecting circuit 69 selects one level from among 64 levels of gradation voltage in accordance with six bit digital one line latch data 68 and outputs the results as one line display data 70. As shown in FIGS. 6 and 7, the gradation level of the one line display data 70 during the data write-in period 44 is outputted in accordance with the one line latch data 68 for each line.

In FIG. 5, the triangular wave generating circuit 71 generates a first triangular wave signal 72 and a second triangular wave signal 73 having different phases, and at the same time generates a triangular wave switching signal 74 in accordance with the horizontal retrace period signal 64. As shown in FIG. 6, the first triangular wave signal 72, which lowers from the maximum level to the minimum level during each frame period 54, and after that reaches the maximum level again, and the second triangular wave signal 73, which rises from the minimum level to the maximum level and reaches the minimum level again, are generated during each frame period 54. The details are given below.

In FIG. 5, the gradation voltage-triangular wave switching circuit 75 follows the triangular wave switching signal 74 and switches the one line display data 70 and the first triangular waveform signal 72 in odd columns so that the results are outputted as a data line driving signal 15, and switches the one line display data 70 and the second triangular wave signal 73 in even columns so that the results are outputted as a data lie driving signal 15. As shown in FIG. 6, one line display data 70 is selected during the data write-in period 44 when the triangular wave switching signal 74 is "low" in odd columns, and the first triangular wave signal 72 is selected during the triangular wave write-in period 45 when it is "high" so that the results are outputted as the data line driving signal 15.

As shown in FIG. 7, in even columns, one line display data 70 is selected during the data write-in period 44 when the triangular wave switching signal 74 is "low," as in odd columns, and the second triangular wave signal 73 is selected during the triangular wave write-in period 45 when the signal is "high" so that the results are outputted as the data line driving signal 15. As described above, a data line driving circuit 14 for outputting triangular wave signals having different phases in odd columns and even columns during the horizontal retrace period is implemented.

The operation of the triangular wave generating circuit 71 in FIG. 5 for generating the first triangular wave signal 72 and the second triangular wave signal 73 is described in detail in reference to FIGS. 8 and 9. In FIG. 8, the reference clock generating circuit 95 generates a reference clock 96 as that shown in FIG. 9. The reference clock 96 is a clock having at least a clock number required for the up-down counting circuit 97 to count down from the initial value "63" to "0" and after that count up to "63" again.

This clock number may be gained by fixing the frequency in advance using a quartz oscillator, or it is also possible to change it using a resistor. In addition, a clock which is multiplied within each frame period 54 may be generated using a PLL. In addition, the reference clock 96 may be outputted continuously or only during the horizontal retrace period. In FIG. 8, the up-down counting circuit 97 carries out a counting operation in accordance with the reference clock 96. As shown in FIG. 9, the count initial value "63" is set at the beginning of each frame period 54, and after that, the reference clock 96 is synchronized, so that a count-down operation is carried out. The clock is switched to the count-up operation after the count value become "0", and the count-up operation is carried out until the value becomes "63" again, so that the results are outputted as the first counting output 98.

Here, though in the present embodiment, the counting operation is carried out in increments of "1," the width for counting is variable, so that the form of the triangular waves can be changed. In addition, the count value is not limited to a range from "0" to "63" in six bit digital. In FIG. 8, the phase adjusting circuit 99 inverts the first counting output 98 as shown in FIG. 9, and outputs the results as the second counting output 100. Here, though in the present embodiment, the second counting output 100 is an inverted output of the first counting output 98, the manner in which the phase is shifted is not limited, and the phase may be shifted in any manner (for example 90°), and the type of phases is not limited to two.

Furthermore, it is also possible to generate a number of triangular waves by providing a number of up-down counting circuits without generating a second counting output 100 from the first counting output 98. In FIG. 8, the digital/analog converting circuit 101 converts the six bit first counting output 98 and second counting output 100 to 64 level analog signals. As shown in FIG. 9, the outputs are converted to analog signals which become of the maximum level when the first counting output 98 and the second counting output 100 are "63" and become of the minimum level when the outputs are "0," and the results are outputted as the first triangular wave signal 72 and the second triangular wave signal 73, respectively.

Here, though in the present embodiment, triangular wave signals are generated through a digital counting operation, the configuration of the generating circuit is not limited, as long as the signals increase or decrease during each frame period. In addition, though triangular waves which increase or decrease during each frame period are generated, they may increase or decrease only during the horizontal retrace period and stop increasing or decreasing at the time of write-in of data. Furthermore, though the triangular wave generating circuit 71 is provided in the data line driving circuit 14, it is also possible to provide the circuit outside, together with the switching circuit for data lines.

Finally, the effects of preventing shift in the outline of moving images are described in reference to FIG. 10. In FIG. 10, the write-in light emission timing 109 at the time of phase shift shows the chronological transition of the state of light emission for the input of a video where a vertical line moves to the right in the case where the phases where write-in and light emission are repeated during each horizontal period are different between odd columns and even columns, and the chronological integral calculus of this state of light emission becomes the state of real display 110 at the time of phase shift as actually visible to the viewer. The light emission timing is different between odd columns and even columns, and therefore, the shift in the outline caused by rewriting of signals differs for each frame, and thus, the shift in the outline is blurry to the human eye and difficult to recognize.

As a result of the above described operation, it becomes possible to gain the effects of preventing shift in the outline of moving images from being visible on a self-luminous element display for controlling the gradation through horizontal retrace light emission.

While we have shown and described several embodiments in accordance with our invention, it should be understood that disclosed embodiments are susceptible to changes and modifications without departing from the scope of the invention. Therefore, we do not intend to be bound by the details shown and described herein, but intend to cover all such changes and modifications within the ambit of the appended claims.

What is claimed is:

1. An image display device, comprising:

a display portion formed of a display region where a number of pixels are aligned in a matrix in rows and columns;

a number of signal lines aligned so as to extend in the column direction of said matrix in order to input a display signal voltage into pixels in said display region; and a signal line driving circuit for applying a signal voltage to said signal lines, characterized in that said signal line driving circuit has a voltage generating circuit which outputs a signal voltage in accordance with input display data to said signal lines during a certain period in one horizontal period and outputs a triangular wave voltage which increases and decreases in one frame period to each of the signal lines with opposite phases between odd columns and even columns of said signal lines during the remaining period of said one horizontal period.

2. An image display device, comprising:

a display portion formed of a display region where a number of pixels are aligned in a matrix in rows and columns;

a number of signal lines aligned so as to extend in the column direction of said matrix in order to input a display signal voltage into pixels in said display region;

a signal line driving circuit for applying a signal voltage to said signal lines;

a voltage generating circuit for generating a voltage which increases and decreases in a certain period; and a switching circuit for switching signals outputted to said signal lines, characterized in that said voltage generating circuit generates two types of voltages:

a voltage which increases and decreases during said one frame period and a voltage gained by inverting this voltage, and said switching circuit switches and outputs said signal voltage in accordance with input display data during one horizontal period and the two types of voltages which increase and decrease during said certain period between signal lines in odd columns and even columns of said signal lines, the two types of voltages being a triangular wave voltage which increases and decreases during said certain period to each of the signal lines with opposite phases between odd columns and even columns of said signal lines during said certain period.

* * * * *